United States Patent [19]

Crozier

[11] Patent Number: 5,093,906
[45] Date of Patent: Mar. 3, 1992

[54] TEXT ORIENTATION SYSTEM FOR DOT MATRIX PRINTERS

[75] Inventor: George W. Crozier, Hatfield, Pa.

[73] Assignee: Unisys Corporation, Blue Bell, Pa.

[21] Appl. No.: 836,285

[22] Filed: Mar. 5, 1986

[51] Int. Cl.[5] ............................................. G06F 15/62
[52] U.S. Cl. .................................... 395/150; 395/110
[58] Field of Search ................................ 364/518–522;
340/723, 720, 727; 382/44–46, 48

[56] References Cited

U.S. PATENT DOCUMENTS

| | | | |
|---|---|---|---|
| 4,300,206 | 11/1981 | Belleson et al. | 364/900 |
| 4,467,448 | 8/1984 | Regehe et al. | 364/900 |
| 4,519,047 | 5/1985 | Crozier et al. | 364/900 |
| 4,539,653 | 9/1985 | Bautlett et al. | 364/900 |
| 4,580,242 | 4/1986 | Suzuki et al. | 364/518 X |
| 4,593,407 | 6/1986 | Konishi et al. | 382/46 |
| 4,603,396 | 7/1986 | Washizuka et al. | 364/520 |
| 4,627,097 | 12/1986 | Finlay et al. | 382/46 |
| 4,635,212 | 1/1987 | Hatazawa | 364/518 |
| 4,656,602 | 4/1987 | Berkland et al. | 364/518 X |
| 4,694,405 | 9/1987 | Bradbury et al. | 364/518 |

*Primary Examiner*—Heather R. Herndon
*Attorney, Agent, or Firm*—John B. Sowell; Mark T. Starr

[57] ABSTRACT

A text orientation system for dot matrix printers includes a character adjust logic for orienting an image to be printed relative to a physical page. A first register in the character adjust logic receives a word of memory for either placement or character address. Each word has base bits and orientation bits. When the word is for address, the first register separates the base bits from the orientation bits and forwards the base bits to an adder and the orientation bits to an orientation adjust logic. Other bits of orientation adjust from a character processor are loaded into a second register and then to the orientation adjust logic for combining with orientation bits. A resulting adjusted signal goes to a Mux for selecting a displacement to produce a displacement signal. The displacement signal is then added to the previously separated base bits and forwarded as an adjusted character address to a character generator address. When the word is for placement, the first register also separates the base and orientation bits. The base bits are forwarded to a microprocessor in the character processor. The orientation bits are adjusted in the orientation adjust logic similar to the orientation bits of the address. The resulting adjusted signal also goes to the microprocessor in the character processor.

12 Claims, 3 Drawing Sheets

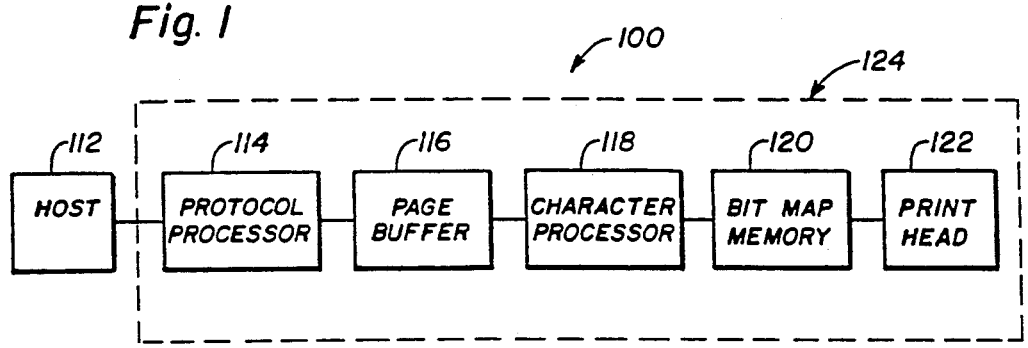
Fig. 1
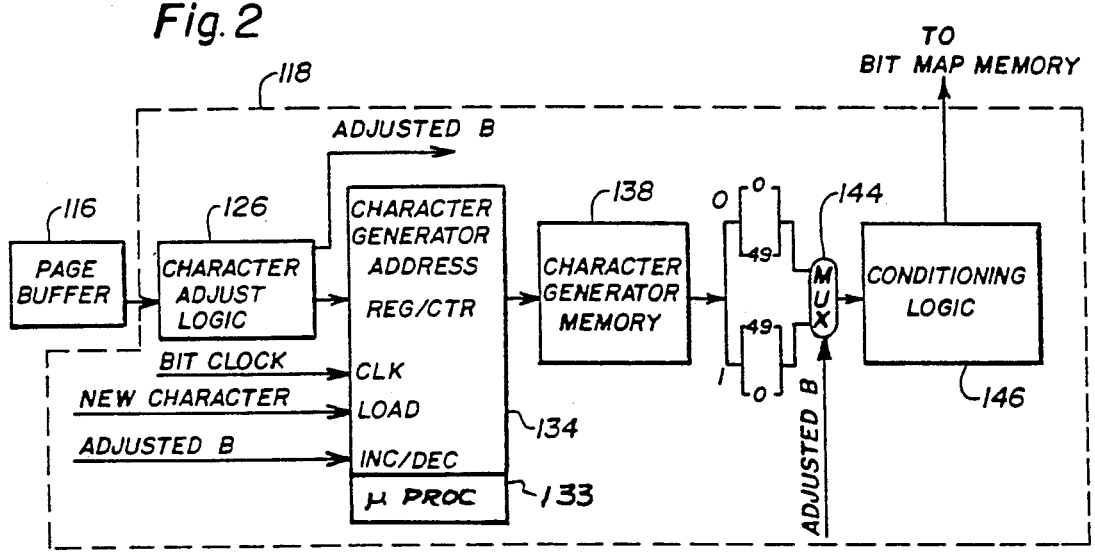
Fig. 2
Fig. 3
| 15 | 14 | 13 | 12 | 11 | 10 | 9 | 8 | 7 | 6 | 5 | 4 | 3 | 2 | 1 | 0 |
|----|----|----|----|----|----|----|----|----|----|----|----|----|----|----|----|
| CHARACTER GENERATOR ADDRESS ||||||||||||| | B | A |
| OPCODE ||||||||||||| | OPERAND ||
| 15 | 14 | 13 | 12 | 11 | 10 | 9 | 8 | 7 | 6 | 5 | 4 | 3 | 2 | 1 | 0 |
|----|----|----|----|----|----|----|----|----|----|----|----|----|----|----|----|
| CHARACTER PLACEMENT COMMAND ||||||||||||| | B | A |
| OPCODE ||||||||||||| | OPERAND ||

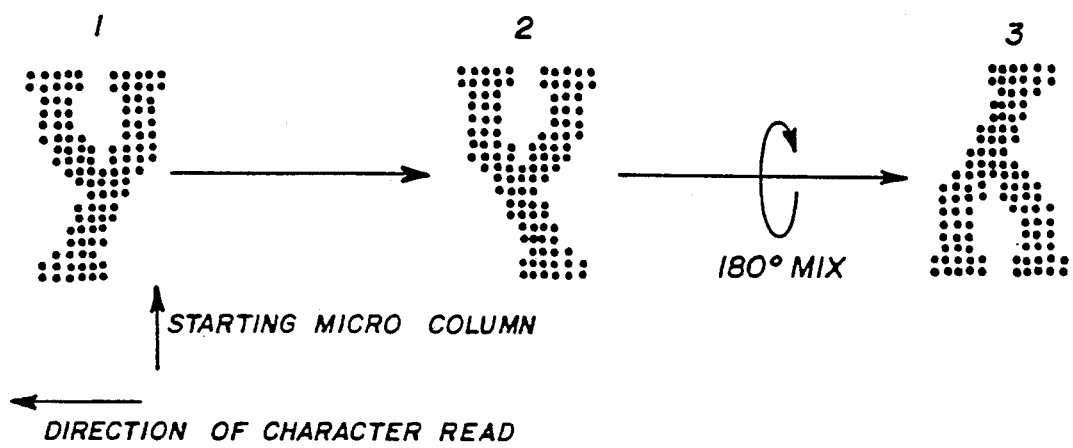

TEXT ORIENTATION SYSTEM FOR DOT MATRIX PRINTERS

FIELD OF THE INVENTION

This invention relates generally to electrical computers and data processing systems and more particularly to a system for controlling a dot matrix printer for generating logical pages in multiple orientations on a physical page.

BACKGROUND DESCRIPTION

Computer controlled printing systems have been used for printing business forms, checks, etc. To be efficient, several logical pages or forms are printed in multiple orientations on a physical page. Such systems typically include a printer peripherally controlled by a host computer. A protocol processor accepts the high level language from the host computer and breaks it down to a form recognizable by the printer. A page buffer typically is interfaced to store the sequential commands for the printer. Also, a bit map memory is used in the system to contain 1 bit for each dot to be printed on a logical page. Printers used in such systems require both target orientation and target positioning information to be included with text data.

It would be advantageous to provide improved means for generating logical pages within the printer's page buffer without regard to target orientation on the physical page. In that way a logical page could be positioned in multiple orientations on the physical page without requiring the host computer to retransmit the logical page. Also, reduced channel thruput could be realized if a the same buffered logical page is used many times, but in different orientations. Further, print files could be used without change on different forms and different printers of the family; for example, cut sheet vs. continuous sheet, impact vs. non-impact.

The foregoing illustrates limitations known to exist in present printing system devices. Thus, it is apparent that it would be advantageous to provide an alternative directed to overcoming one or more of the limitations set forth above. Accordingly, a suitable alternative is provided including features more fully disclosed hereinafter.

SUMMARY OF THE INVENTION

In one aspect of the present invention, this is accomplished by providing an improved character processor in a text orientation system for dot matrix printers including means for receiving a word of memory having base bits and orientation bits and for separating the orientation bits from the base bits. A buffered register is loaded with the bits of orientation adjust. Means are provided for receiving the orientation bits and adding them to the bits of orientation adjust to produce adjusted signal bits. Means are also provided for receiving the adjusted signal bits for selecting a displacement code to produce a displacement signal. The displacement code signal is then added to the base bits previously separated from the orientation bits to form a new adjusted character address.

The foregoing and other aspects will become apparent from the following detailed description of the invention when considered in conjunction with the accompanying drawing. It is to be expressly understood, however, that the drawing is not intended as a definition of the invention but is for the purpose of illustration only.

BRIEF DESCRIPTION OF THE DRAWING

In the drawing:

FIG. 1 is a diagrammatic view illustrating an embodiment of a known printer system showing a character processor;

FIG. 2 is a diagrammatic view further illustrating a preferred embodiment of the new character processor for a FIG. 1 printer system;

FIG. 3 is a view illustrating a word of memory including a character generator address and a character placement commands;

FIG. 6 is a view illustrating a step-by-step example of a 0° character being rotated 180°.

DESCRIPTION OF THE PREFERRED EMBODIMENT

Figure 4:
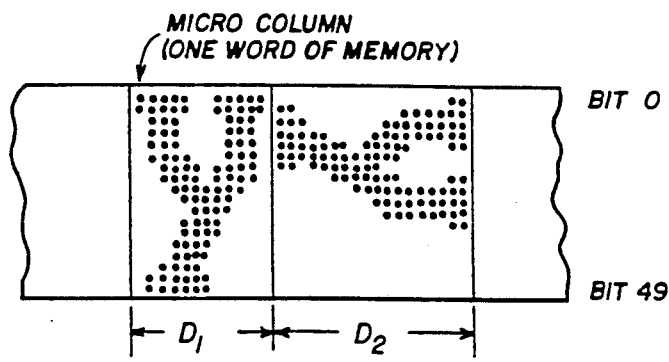
FIG. 4 is a view illustrating orientation of a character generator memory configuration.

FIG. 1 illustrates a known printer system generally designated 100 including a host or main computer 112, operably connected to a printer system 124. Included in printer system 124 is a protocol processor 114, a page buffer 116, a character processor 118, a bit map memory 120 and a print head 122. Host 112 may be any well known mainframe computer for the purpose of controlling printer system 124. Protocol processor 114 is a microprocessor which accepts high level language from host 112 and breaks it down to a form recognizable by character processor 118. Page buffer 116 is a large memory which stores all sequential commands for character processor 118 which, functions to orient the physical image to be printed relative to the page. Bit map memory 120 is a memory containing 1 bit for each dot to be printed on a logic page. Print head 122 is commercially available and may be for example a laser type, a non-impact or impact type, dot matrix printer of either the continuous form or cut sheet paper type.

Referring now to FIG. 2, the present invention character processor 118 is illustrated in further detail for receiving a signal from page buffer 116, processing the signal and forwarding the processed signal to bit map memory 120. The signal received from page buffer 116 includes a word of memory. The word may include 14 base bits of character generator address or a character placement command as illustrated in FIG. 3. Both the character generator addresses and character placement commands employed to produce a logical page, are also provided with a novel 2 bit operand field including orientation bits B and A for a total of 16 bits per word. These orientation bits specify the orientation of the character to be printed on the logical page. All 16 word bits are received as a signal in a character adjust logic 126, FIG. 2, for the purpose of adjusting bits B and A to place the image in the desired orientation for printing on the physical page.

Adjustment of bits B and A relate to orientation as follows:

| B | A | Orientation |
|---|---|---|
| 0 | 0 | 0° |
| 0 | 1 | 90° |
| 1 | 0 | 180° |

-continued

| B | A | Orientation |
|---|---|---|
| 1 | 1 | 270° |

Thus it can be seen for example, referring to FIG. 4, that adjustment of bits B and A from 00 to 01 results in changing an image from a common orientation of 0° to a reorientation of 90°.

Figure 5:
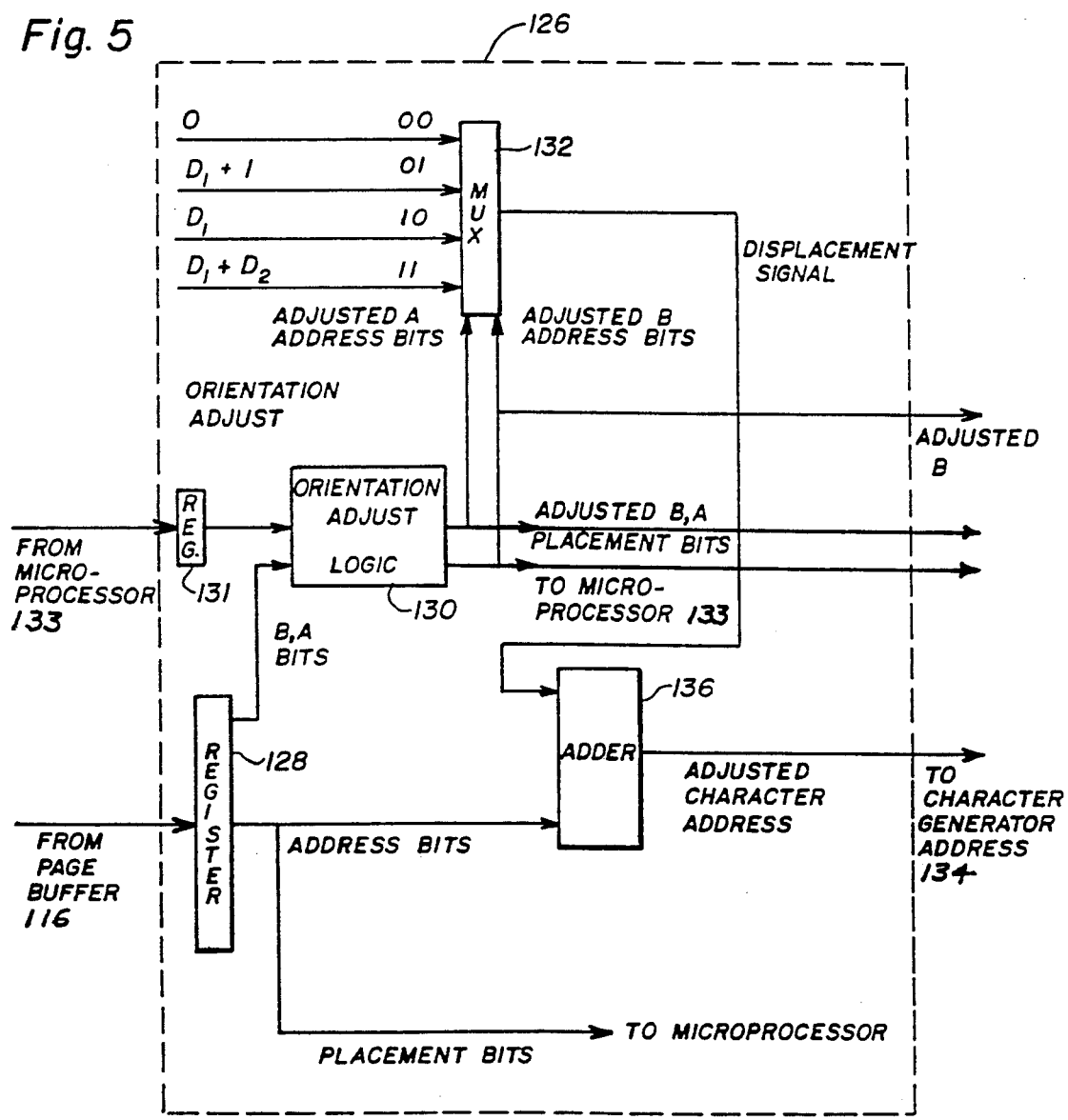
FIG. 5 is a view illustrating an embodiment of character adjust logic included in this invention.

The signal which the character adjust logic 126 receives, see FIGS. 2 and 5, from page buffer 116 includes the above-mentioned 16 word bits. This signal, which may be a character generator address or a character placement command, is loaded into a register 128 where the B and A operand bits are separated from the other 14 address bits. The B and A bits are then received by an orientation adjust logic 130. Adjust logic 130 may be an integrated logic circuit such as a commercially available 4-bit binary full adder. Also feeding into adjust logic 130 is a prestored amount of orientation adjust in the form of 2 bits loaded into a register 131 from a microprocessor or programmable logic in character processor 118. A resulting signal from adjust logic 130 includes the B and A bits which have now been adjusted to the desired orientation. If the signal received by character adjust logic 126 is for placement, then the resulting adjusted B, A signal from adjust logic 130 is directly coupled to the microprocessor 133 in character processor 118 as do the other 14 address bits of that word. If the signal received by character adjust logic 126 is for a character address, then the adjusted B, A signal from adjust logic 130 goes to a mux 132 for selection of the displacement signal and an adjusted character generator address. Such displacement signal is illustrated by the displacement 0, $D_1 + 1$, $D_1$ and $D_1 + D_2$. A resulting displacement signal goes to an adder 136 which adds the displacement signal to the 14-bit character address signal received from register 128. As a result, an adjusted character address signal shown in FIG. 5 is coupled to a character generator address register/counter 134 shown in FIG. 2.

The adjusted orientation B bit from adjust logic 130, is also used to condition the increment/decrement input of character generator address register/counter 134. The output of character generator address register/counter 134 addresses a character generator memory 138, one micro column at a time. Vertical micro columns in memory 138 are illustrated in FIG. 4 showing character width and height dimensions $D_1$ and $D_2$. A bit clock is connected to provide a clocking signal into character generator address register/counter 134 as a means of controlling the access of character generator memory 138. A new character input in character generator address register/counter 134 loads the starting address of the next character to be accessed from character generator memory 138.

The output of character generator memory 138 (bits 0–49) are applied to two inputs 0 and, 1 of a 180° Mux designated 144. Mux 144 is controlled by the adjusted orientation B bit from adjust logic 130. The input 0, of Mux 144 has the character generator bits from memory 138 connected 0 to 49 from top to bottom as viewed in FIG. 2. The other input 1, of Mux 144 has the character generator bits from memory 138 connected from 49 to 0 from top to bottom as viewed in FIG. 2. The output of Mux 144 feeds pixel information into an interface or conditioning logic 146 which is printed out by printer 122 controls the dot matrix input to bit map memory 120.

The foregoing has described a text orientation system for dot matrix printers 124 and including means for orienting an image to be printed relative to a physical page. A word of memory which, including base bits and orientation bits, is received and the orientation bits are separated from the base bits. The orientation bits are then adjusted to produce an adjusted signal for placing the image in a desired orientation on a physical page. If the word is for address generation the adjusted signal then selects a displacement signal which is added to the base bits. The resulting signal is forwarded to a character generator address register/counter 134 and a character generator memory 138. A 180° Mux receives the signal from the character generator memory 138 and forwards the signal to the conditioning logic 146 which is connected to control a print head 122. If the word is for placement, the adjusted signal and the base bits go directly to a microprocessor 133 in the character processor 118 portion of the printer system 124.

In this way, logical pages are generated within the printer's page buffer 116 without regard to target orientation on the physical page. Thus, the logical page or pages can be positioned in multiple orientations on the physical page without requiring the host computer 112 to retransmit the logical page to the printer system 24.

FIG. 6 illustrates how the novel character processor 118 can read the characters shown diagrammatically in memory 138 in FIG. 4 as vertical micro columns in reverse or forward order and by selecting inverted or standard position order in mux 144 rotate any character 180°. Thus, it will be understood that any character stored in memory 138 can be printed out as a part of a logical page in 0°, 90°, 180° or 270° orientation at any desired position on a physical page and that any desired form (logical page) may be printed out with other logical pages on the same physical page to provide a set of desired forms on the same physical page.

Having thus described the invention, what is claimed is:

1. A character processor for a text orientation system for dot matrix printers comprising:
   means for receiving a word of memory having coded base bits and operand orientation bits and for separating the operand orientation bits from the coded base bits;
   means for generating orientation adjust bits,
   a register for receiving said orientation adjust bits;
   adjustment means for receiving the operand orientation bits and for adding the operand orientation bits to the orientation adjust bits and for forming an adjusted operand signal;
   multiplexer means for receiving the adjusted operand signal and for selecting a displacement signal to produce an output displacement signal; and
   adder means for receiving and adding the output displacement signal to the separated coded base bits for forming an adjusted character address.

2. A text orientation system for dot matrix printers comprising:
   a host computer;
   a printer system coupled to the host computer;
   means in the printer system for orienting an image to be printed relative to a physical page, said means for orienting an image including means for receiving a word of memory having coded base bits and operand orientation bits and for separating the operand orientation bits from the coded base bits and adjusting the operand orientation bits to produce an adjusted operand signal for placing the image to be printed in a desired orientation on a physical page; a character generator address register/counter coupled to receive the adjusted operand signal and generate a character address signal;

a character generator memory coupled to receive the character address signal from the character generator address register/counter and generate dot pattern output signals;

a 180° Mux coupled to receive the dot pattern output signals from the character generator memory; and interface logic coupled to control a print head of the printer system and coupled to receive the output signals derived from the 180° Mux.

3. The text system of claim 2 further including:

means for receiving the operand orientation bits and for adding the operand orientation bits to provide orientation adjust bits and for forming the adjusted operand signal;

multiplexer means for receiving the adjusted operand signal and for selecting a displacement signal for producing an output displacement signal; and adder means for receiving and adding the output displacement signal to the separated coded base bits for generating adjusted character address signals.

4. The system of claim 2 including:

means for receiving the operand orientation bits and for adding the operand orientation bits to orientation adjust bits and for forming the adjusted operand signal.

5. The system of claim 4 including:

means for receiving the adjusted operand signal and for selecting a displacement value signal for producing an output displacement signal.

6. The system of claim 5 including:

adder means for receiving and adding the output displacement signal to the separated coded base bits as an input to the character generator address register/counter.

7. A text orientation system for dot matrix printers as set forth in claim 2 wherein said printer system includes means for accepting high level language commands from the host computer and for storing all sequential commands for the printer system, bit memory map means coupled to said interface logic for storing 1 bit or each dot of the image to the printed by said print head.

8. The text system of claim 7 wherein said means for orienting an image comprises:

means for receiving the operand orientation bits and for adding the operand orientation bits orientation adjust bits and for forming the adjusted operand signal;

multiplexer means for receiving the adjusted operand signal and for selecting a displacement signal for producing an output displacement signal; and adder means for receiving and adding the output displacement signal to the separated coded base bits as an input to the character generator address register/counter.

9. A character processor for a text orientation system for dot matrix printers comprising:

a first register for receiving a work of memory including operand orientation bits and coded base bits and also having a capacity for separating the operand orientation bits from the coded base bits;

a second register for receiving orientation adjust bits;

orientation adjust logic means coupled to receive the operand orientation bits and the orientation adjust bits and for producing an adjusted operand signal;

a Mux coupled to receive the adjusted operand signal and to select an input displacement signal and for producing an output displacement signal;

adder means coupled to receive and add the output displacement signal and the separated coded base bits to produce an adjusted character address.

10. A text orientation system for dot matrix printers comprising:

a host computer;

a printer system coupled to the host computer;

character adjust logic in the printer system having a capacity for orienting an image to be printed relative to a physical page in response to a word of memory from said host computer having coded bits and operand orientation bits, separating the operand orientation bits from the coded base bits and adjusting the orientation bits to produce an adjusted operand signal, multiplexer means for selecting a displacement and for producing an output displacement signal and adding the output displacement signal to the separated coded base bits for producing an adjusted character address;

a character generator address register/counter coupled to receive the adjusted character address;

a character generator memory coupled to receive output signals from the character generator address register/counter for producing dot matrix pattern signals;

a 180° Mux coupled to receive said signals from the character generator memory; and interface logic coupled to receive signals from the 180° Mux and control a print head of the dot matrix printer.

11. A text orientation system for dot matrix printers comprising:

a host computer;

a printer system coupled to the host computer;

character processor logic in the printer system having a capacity for orienting an image to be printed relative to a physical page, said character processor logic including means for receiving a work of memory from said host computer having coded base bits and operand orientation bits and for separating the operand orientation bits from the coded base bits, a register for receiving orientation adjust bits, logic means for receiving the operand orientation bits and for adding the operand orientation bits to the orientation adjust bits for forming an adjusted operand signal, multiplexer means for receiving the adjusted operand signal and for selecting a displacement signal to produce an output displacement signal, and adder means for receiving and adding the displacement signal to the separated coded base bits for forming adjusted character address signals;

a character generator address register/counter coupled to receive the adjusted character address signals and produce an adjusted character address;

a character generator memory coupled to receive the adjusted character address from the character generator address register/counter and to produce dot matrix signals;

a 180° Mux coupled to received said dot matrix signals from the character memory; and interface logic coupled to receive said dot matrix signals from the 180° Mux and to control a print head of said dot matrix printer.

12. A text orientation system for dot matrix printers comprising;

a host computer;

a printer system coupled to the host computer;

character processor logic in the printer system having a capacity for orienting an image to be printed relative to a physical page, said character processor logic including a first register having a capacity for receiving a work of memory from said host computer including operand orientation bits and coded base bits and also having a capacity for separating the operand orientation bits from the coded base bits, a second register having a capacity for receiving orientation adjust bits, orientation adjust logic coupled to receive the operand orientation bits and the orientation adjust bits and produce an adjusted operand signal, a first Mux coupled to received the adjusted operand signal and select a displacement value for producing an output displacement signal, adder means coupled to receive and add the output displacement signal and the separated coded base bits to produce an adjusted character address signals;

a character generator address register/counter coupled to receive the adjusted character address signals and produce an adjusted character address;

a character generator memory coupled to receive the adjusted character address from the character generator address register/counter and to produce dot matrix signals;

a second Mux being a 180° Mux coupled to receive said dot matrix signals from the character generator memory; and interface logic coupled to receive dot matrix signals from the 180° Mux and to control a print head of the printer system.

* * * * *